US010563103B2

(12) United States Patent
Kelch et al.

(10) Patent No.: US 10,563,103 B2
(45) Date of Patent: Feb. 18, 2020

(54) HYDROPHOBIC AND HIGHLY ELASTIC TWO-COMPONENT POLYURETHANE COMPOSITION HAVING MECHANICAL PROPERTIES AND ADHESIVE PROPERTIES NOT DEPENDENT ON TEMPERATURE

(71) Applicant: SIKA TECHNOLOGY AG, Baar (CH)

(72) Inventors: Steffen Kelch, Oberengstringen (CH); Michael Schlumpf, Stallikon (CH); Tina Voci, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 15/743,425

(22) PCT Filed: Jul. 26, 2016

(86) PCT No.: PCT/EP2016/067766
§ 371 (c)(1),
(2) Date: Jan. 10, 2018

(87) PCT Pub. No.: WO2017/017089
PCT Pub. Date: Feb. 2, 2017

(65) Prior Publication Data
US 2018/0201815 A1 Jul. 19, 2018

(30) Foreign Application Priority Data
Jul. 30, 2015 (EP) .................................. 15179142

(51) Int. Cl.
*C09J 175/14* (2006.01)
*C08G 18/48* (2006.01)
(Continued)

(52) U.S. Cl.
CPC ............ *C09J 175/14* (2013.01); *C08G 18/10* (2013.01); *C08G 18/4063* (2013.01);
(Continued)

(58) Field of Classification Search
CPC ........................... C08G 18/69; C08G 18/5027; C08G 18/4009; C08G 18/4854
See application file for complete search history.

(56) References Cited

U.S. PATENT DOCUMENTS 4,812,524 A * 3/1989 Baghdachi ........... C08G 18/696
156/331.4
5,994,466 A * 11/1999 Yang .................. C08G 18/4854
525/130

(Continued)

FOREIGN PATENT DOCUMENTS

EP    1 279 687 A2    1/2003
FR    2 772 781 A1    6/1999

(Continued)

OTHER PUBLICATIONS

Polybutadiene properties. Cray Valley. Product Bulletin: Hydroxyl-Terminated Polybutadiene resins and derivatives—Polybd and Krasol. Evidentiary Reference. (Year: 2016).*
Versalink Properties. Evonik. Additives for Polyurethane Case Applications—EMEA. Evidentiary reference. (Year: 2019).*
(Continued)

*Primary Examiner* — Michael M Dollinger
(74) *Attorney, Agent, or Firm* — Oliff PLC

(57) ABSTRACT

A two-component polyurethane composition includes a first component, including at least one polybutadiene polyol P1 having an average molecular weight of 2,000 to 10,000 g/mol and an average OH functionality of 2.1 to 4, and a second component, including at least one polyisocyanate and optionally at least one isocyanate-terminated polyurethane prepolymer. The composition also contains at least one hydrophobic diol P2 having an average molecular weight of 500 to 5,000 g/mol, selected from polybutadiene diols, polyester diols, polycarbonate diols, polyether diols having a repeat unit having at least 4 C atoms, and/or at least one hydrophobic compound P3, which is terminated with amino groups and has an average molecular weight in the range of
(Continued)

200 to 2,000 g/mol. The ratio of the number of hydroxyl groups from P1 to the number of hydroxyl and primary and secondary amino groups from P2 and P3 is 2:1 to 16:1.

16 Claims, 1 Drawing Sheet

(51) Int. Cl.
    *C08G 18/50*     (2006.01)
    *C08G 18/76*     (2006.01)
    *C08G 18/10*     (2006.01)
    *C08G 18/44*     (2006.01)
    *C08G 18/40*     (2006.01)
    *C08G 18/42*     (2006.01)
    *C08G 18/62*     (2006.01)
    *C09J 5/00*     (2006.01)

(52) U.S. Cl.
    CPC .............. *C08G 18/42* (2013.01); *C08G 18/44* (2013.01); *C08G 18/482* (2013.01); *C08G 18/4854* (2013.01); *C08G 18/5027* (2013.01); *C08G 18/6204* (2013.01); *C08G 18/7671* (2013.01); *C09J 5/00* (2013.01); *C09J 2475/00* (2013.01)

(56) References Cited

U.S. PATENT DOCUMENTS

| | | | | |
|---|---|---|---|---|
| 6,355,760 | B1* | 3/2002 | Papon | C08G 18/6588 428/339 |
| 8,168,743 | B2* | 5/2012 | Taden | C08G 18/10 524/500 |
| 9,896,609 | B2* | 2/2018 | Roock | C08G 18/6588 |
| 2003/0149179 | A1* | 8/2003 | Chao | C08G 18/10 525/232 |
| 2005/0087290 | A1* | 4/2005 | Herold | B29C 65/1416 156/272.2 |
| 2006/0247370 | A1 | 11/2006 | Frye et al. | |
| 2009/0171015 | A1* | 7/2009 | Uchida | C08G 18/0823 524/590 |
| 2015/0203728 | A1* | 7/2015 | Burckhardt | C08G 18/4841 156/331.7 |

FOREIGN PATENT DOCUMENTS

| | | |
|---|---|---|
| JP | 2000-290630 A | 10/2000 |
| WO | 2010052671 A1 | 5/2010 |
| WO | 2014/040992 A1 | 3/2014 |

OTHER PUBLICATIONS

Oct. 28, 2016 International Search Report issued in International Patent Application No. PCT/EP2016/067766.

\* cited by examiner

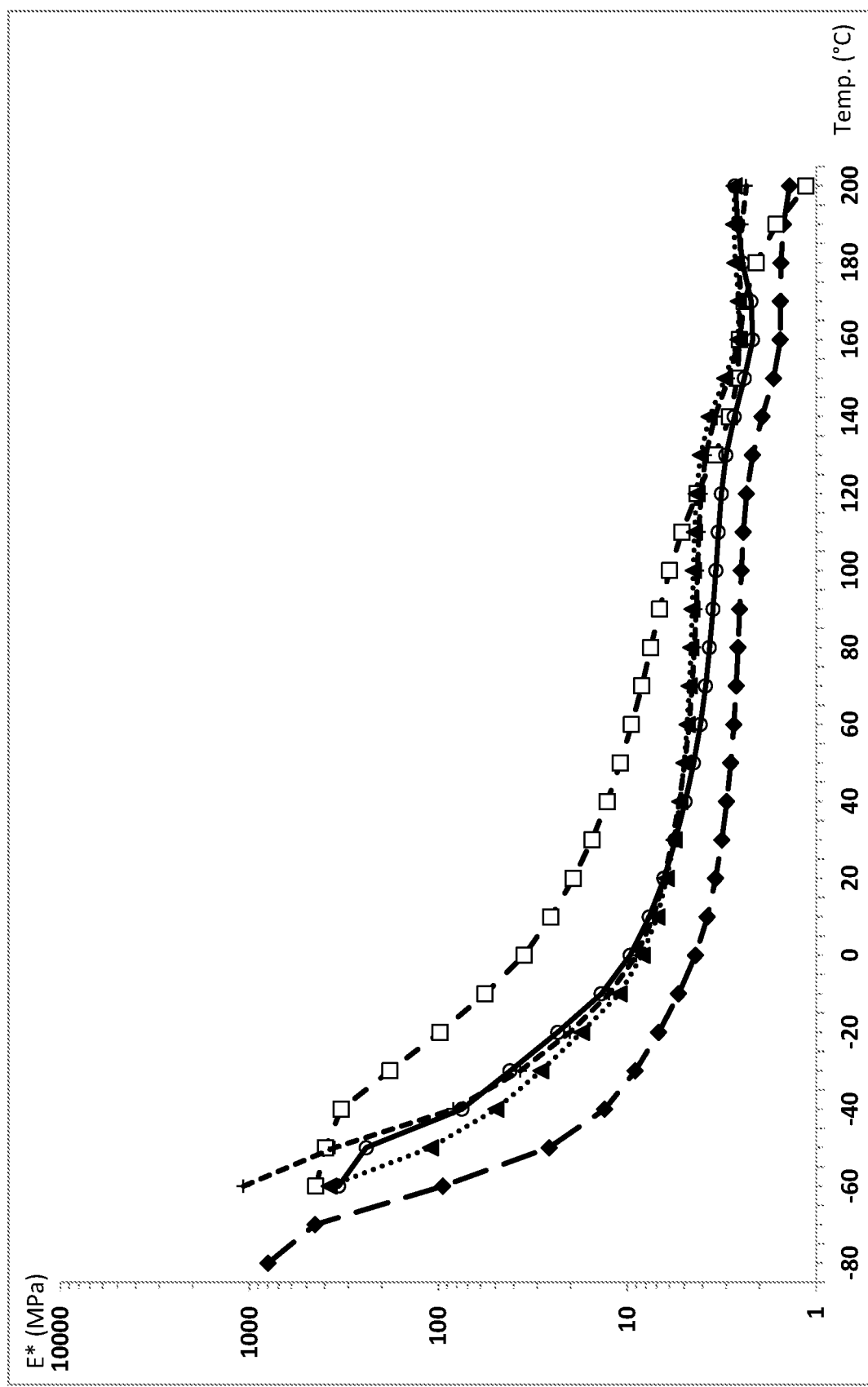

HYDROPHOBIC AND HIGHLY ELASTIC TWO-COMPONENT POLYURETHANE COMPOSITION HAVING MECHANICAL PROPERTIES AND ADHESIVE PROPERTIES NOT DEPENDENT ON TEMPERATURE

TECHNICAL FIELD

The invention relates to the field of two-component polyurethane compositions and to the use thereof as an adhesive or sealant.

STATE OF THE ART

Structural adhesives, including construction and assembly adhesives, are frequently used in the manufacturing industry in order to bond components to one another such that the adhesive bond is part of a permanently load-bearing construction. Adhesives of this kind are typically elastic and have to fulfill high demands in relation to their processibility, strength and bonding forces. For applications of this kind, the use of two-component polyurethane compositions based on polyols and polyisocyanates has long been known.

By comparison with one-component polyurethane compositions, two-component polyurethane compositions offer the advantage of accelerated buildup of strength. This is because a reaction with air humidity is required for the curing of one-component polyurethane compositions, the rate of which is also diffusion-controlled and hence can only be accelerated to a limited degree. In the case of two-component polyurethane compositions, the components react rapidly and reliably after they have been mixed to cure with one another even if only a little water is available from the environment.

Moreover, in the case of two-component polyurethane compositions, through suitable assembly of the individual components, it is possible to achieve a broader spectrum of mechanical properties ranging from soft elastic to highly structural properties. However, a restriction by comparison with one-component polyurethane compositions that comes to bear especially in the case of viscoelastic material properties is in relation to the glass transition temperature, which is much higher for two-component polyurethane compositions and hence can also fall within the use temperature range of the adhesive. In the case of a viscoelastic adhesive, the effect of this is that the stiffness and modulus of elasticity rise significantly as the temperature falls to or close to the glass transition temperature, such that the adhesive has highly variable mechanical properties when viewed over the entire use temperature range. This makes it relatively difficult to suitably design the bond, especially in the case of adhesives that are subject to large temperature differences in the course of use.

On the other hand, two-component polyurethane compositions, as well as the aforementioned rapid buildup of strength, have the further advantage that they can consist exclusively of hydrophobic raw materials. As a result, the adhesives obtained from such compositions after curing generally have only low water absorption and exhibit improved aging resistance. Furthermore, there is a significant improvement in the buildup of adhesion on low-energy surfaces such as polyolefins or polycarbonates compared to polyurethanes, which are based on polar units.

One example of a polyurethane adhesive based on hydrophobic polybutadienes is described in U.S. Pat. No. 4,812,524 A. The adhesives disclosed in U.S. Pat. No. 4,812,524 are based on combinations of amine- and hydroxyl-terminated polybutadienes, which are reacted with polyisocyanates to give polyurethanes. The adhesives described are said to feature excellent bonding properties and strong binding to steel substrates.

FR 2 772 781 A describes polyurethane adhesives having high shear resistance, based on combinations of hydroxyl-terminated polybutadienes, polybutadiene polyols modified with polyethylene glycol side chains, and polyisocyanates. It is stated that the shear resistance can be improved by the addition of polybutadiene polyols modified with polyethylene glycol side chains, especially when relatively long polyethylene glycol side chains are used.

A further advantage of two-component polyurethane compositions is that, compared to corresponding one-component polyurethane compositions, there is generally no need to add plasticizers for the formulation of flexible adhesives, and so migration of the plasticizers out of the adhesive, for example into adjoining substrates, which can lead to deterioration in the bonding properties, is avoided. This problem occurs especially in the case of bonding of glassy thermoplastics such as polycarbonate, polymethylmethacrylate or polystyrene, where migration of plasticizer from the adhesive into the substrate can lead to formation of stress cracks.

For many bonded constructions, it is important that the adhesive has very homogeneous strength, for example a very homogeneous modulus of elasticity, over its entire use temperature range, especially within the temperature range from about −35° C. to about 80° C., such that the mechanical characteristics of the adhesive bond can be incorporated into the calculation for the construction in a suitable manner. What are desired are especially adhesives that are not glassy or brittle but tough and elastic. For this purpose, the adhesives should have a low lower glass transition temperature that should be well below the use temperature. By way of background in this regard, it should be noted that there are frequently two or more glass transition temperatures observed in the case of polyurethanes formed from polymeric polyols on the one hand and, for example, low molecular weight chain extenders and diisocyanates on the other hand. These are caused by the phases that form, consisting of chain segments of the polymeric polyol and chain segments that are rich in urethane bonds and hence capable of forming hydrogen bonds, which form by polyaddition reaction of diisocyanates and short-chain diols, called chain extenders.

Moreover, the adhesives, within their use temperature range, should have either no further glass transition temperatures or at least have only very weak further glass transition temperatures that originate from mixed phases that form from the above-described phases, since glass transition temperatures of this kind are associated with changes, for example, in the modulus of elasticity of the adhesive. The freshly mixed adhesives should additionally have good processibility and be usable in relatively high layer thicknesses of up to 10 mm or more, and be curable either at ambient temperature or in a heat-accelerated curing process in a defect-free manner to give the final strength. Finally, the adhesives should exhibit good binding to paint-coated metallic substrates and substrates having low surface energy.

WO 2010/052671 describes polyurethane compositions for cryogenic applications down to temperatures of −170° C., which are supposed to have a shear strength of more than 10 MPa. The compositions described consist of a first component comprising a polyol selected from polyether polyols, polyester polyols and unsaturated polyols, thermoplastic polyurethanes and prepolymers having an average molecular weight between 200 and 9'000 g/mol and an OH functionality of 2 to 4.6, and an amine. The second component comprises a polyurethane polymer having an average molecular weight of 840 to 2'100 g/mol and an NCO functionality of 2 to 4. These adhesives are said to be especially suitable for the bonding and sealing of multilayer structures with respect to gases and liquids, and owing to their thermal stability can be used down to temperatures of −170° C. for the production of vessels for liquid methane (LNG).

WO 2014/040992 A1 describes structural polyurethane adhesives having lower glass transition temperatures in the range from about −40 to −42° C. These adhesives consist of a first component formed from a triol having a molecular weight in the range from 1'000 to 10'000 g/mol, a diol having a molecular weight in the range from 60 to 150 g/mol and an aliphatic polyamine having a molecular weight in the range from 60 to 500 g/mol, and a second component comprising a polyisocyanate and a polyurethane polymer having isocyanate groups. The triol, the diol and the polyamine should be present in such amounts that the ratio of the number of the OH groups and the $NH_2$ groups from diol and polyamine compared to the OH groups from the triol is in the range from 3 to 15, and that the ratio of the OH groups and $NH_2$ groups from diol and polyamine is in the range from 2 to 30. For curing of these polyurethane adhesives, catalysts in the form of metal chelate complexes based on Fe(III), Ti(IV), Zr(IV) and Hf(IV) are used.

US 2006/247370 A1 describes solvent-resistant pressure-sensitive adhesives based on silylated polymers that derive from butadienes. In the preparation of the polymers, polyhydroxybutadienes are first reacted with polyisocyanates. Subsequently, the isocyanate groups remaining in the product after the reaction are modified with silanes. The polymers thus obtained cure on contact with water and are said to have improved solvent resistance.

EP 1 279 687 A2 describes compositions comprising a mixture of unbranched polybutadienes having fewer than two hydroxyl groups per molecule and branched polybutadienes having more than two hydroxyl groups per molecule. These mixtures are reacted with polyisocyanates to give prepolymers, and after chain extension are said to feature improved thermoplasticity and an improved modulus. This makes the prepolymers usable for various applications such as water-resistant membranes, sealing agents, hotmelt adhesives, geomembranes or liquid binders for braking systems.

SUMMARY OF THE INVENTION

The adhesive system disclosed in WO 2014/040992 A1 already has good use properties in the temperature range of down to about −35° C. In some applications, for example in aircraft construction, however, the components are also subjected to temperatures in the region of −40° C. during use. At these temperatures, there would be a significant change in the elasticity properties of the adhesive systems disclosed in WO 2014/040992 A1.

There is therefore a need for adhesive and sealant systems, especially for two-component adhesive and sealant systems, having a lower glass transition temperature in the range from about −50° C. or even better −55° C. and having very similar elastic properties such as elongation at break and modulus of elasticity over a wider temperature range, for example up to about 100° C. or even up to about 150° C.

It has been found that, surprisingly, this object is achieved by a two-component polyurethane composition as claimed in claim 1. This composition comprises a combination of at least one polybutadiene polyol having an OH functionality in the range from 2.1 to 4 and at least one hydrophobic diol and/or at least one hydrophobic compound terminated by amino groups in a selected ratio. It has been found that, surprisingly, this polyurethane composition cures to give a material having high strength and elasticity while exhibiting only a weak dependence of the mechanical properties on temperature and having very good bonding properties on different substrates, whereas similar compositions where these substances are present in different ratios or which contain different polyols or diols do not exhibit these advantageous properties. Moreover, this polyurethane composition is particularly resistant to moisture.

Further aspects of the invention are the subject of further independent claims. Particularly preferred embodiments of the invention are the subject of the dependent claims.

BRIEF DESCRIPTION OF THE DRAWINGS

FIG. 1 is drawn to a plot of the modulus of elasticity (complex modulus of elasticity E*[MPa] as a function of the temperature [° C.]) for the compositions Rf.1 (♦), Rf. 3 (□), Z-3 (▲), Z-6 (○) and Z-10 (+).

Ways of Executing the Invention

The present invention relates to a two-component polyurethane composition comprising a first component comprising at least one polybutadiene polyol P1 having an average molecular weight in the range from 2'000 to 10'000 g/mol and an average OH functionality in the range from 2.1 to 4, and a second component comprising at least one polyisocyanate and optionally at least one isocyanate-terminated polyurethane prepolymer, wherein the polyurethane composition further comprises at least one hydrophobic diol P2 having an average molecular weight in the range from 500 to 5'000 g/mol selected from the group consisting of polybutadiene diols, polyester diols, polycarbonate diols and polyether diols having a repeat unit having at least 4 carbon atoms and/or at least one hydrophobic compound P3 terminated by amino groups and having an average molecular weight in the range from 200 to 2'000 g/mol, where the molar ratio V1 of the number of hydroxyl groups from the polybutadiene polyol P1 to the number of hydroxyl and primary and secondary amino groups from the diol P2 and the compound P3 is in the range from 2:1 to 16:1.

The prefix "poly" in substance names such as "polyol", "polyisocyanate", "polyether" or "polyamine" in the present document indicates that the respective substance, in a formal sense, contains more than one of the functional groups that occur in its name per molecule.

"Molecular weight" is understood in the present document to mean the molar mass (in grams per mole) of a molecule. "Average molecular weight" is understood to mean the number-average $M_n$ of an oligomeric or polymeric mixture of molecules, which is typically determined by means of gel permeation chromatography (GPC) against polystyrene as standard.

"Open time" in this document refers to the time within which the parts to be bonded have to be joined after the components have been mixed.

The term "strength" in the present document refers to the strength of the cured composition, and strength especially means the tensile strength and modulus of elasticity, especially within the expansion range of 0.5% to 5%.

"Room temperature" in the present document refers to a temperature of 23° C. The "average OH functionality" is the number of OH groups per polymer molecule, averaged over all the polymer molecules. If, for example, 50% of all polymer molecules contain two hydroxyl groups and the other 50% contain three, the result is an average OH functionality of 2.5. The average OH functionality can especially be ascertained by calculation from the hydroxyl number and the molecular weight $M_n$ ascertained via GPC.

The first component of the composition comprises at least one polybutadiene polyol P1 having an average molecular weight in the range from 2'000 to 10'000 g/mol and an average OH functionality in the range from 2.1 to 4. The average molecular weight of the polybutadiene polyol P1 is preferably in the range from 2'000 to 4'000 g/mol, especially in the range from 2'500 to 3'000 g/mol.

The average OH functionality of the polybutadiene polyol P1 is preferably in the range from 2.1 to 2.9, especially in the range from 2.3 to 2.7.

Such a polybutadiene polyol is obtainable in a simple manner and has comparatively low viscosity, which enables good processability of the composition.

Suitable polybutadiene polyols are especially obtainable by polymerization of 1,3-butadiene and allyl alcohol in a suitable ratio or by oxidation of suitable polybutadienes.

Suitable polybutadiene polyols especially contain structural elements of the formula (I) and optionally structural elements of the formula (II) or (III).

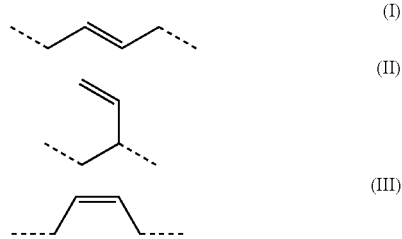

A preferred polybutadiene polyol contains

40% to 80%, especially 55% to 65%, of the structural element of the formula (I), 0% to 30%, especially 15% to 25%, of the structural element of the formula (II), 0% to 30%, especially 15% to 25%, of the structural element of the formula (III).

A particularly suitable polybutadiene polyol is Poly Bd® R-45HTLO or Poly Bd® R-45M (both from Cray Valley)

Preferably, the two-component polyurethane composition contains a total of at least 40% by weight, especially 45% to 85% by weight, more preferably 50% to 70% by weight, of polybutadiene polyol P1.

The two-component polyurethane composition further comprises
at least one hydrophobic diol P2 having an average molecular weight in the range from 500 to 5'000 g/mol selected from the group consisting of polybutadiene diols, polyester diols, polycarbonate diols and polyether diols having a repeat unit having at least 4 carbon atoms, where the polyether diols having a repeat unit having at least 4 carbon atoms are preferably polytetramethylene oxide diol, and/or
at least one hydrophobic compound P3 terminated by amino groups and having an average molecular weight in the range from 200 to 2'000 g/mol.

The term "hydrophobic" in connection with the diol P2 should be regarded such that the parent polymer of the diol has not been modified with hydrophilic functionalities, for example in the form of polar functional groups on the main chain or appended side chains formed from hydrophilic polyethers such as polyethylene glycols and polypropylene glycols, since such modifications would significantly impair the hydrophobic properties. In the context of the invention, it is accordingly preferable when the parent polymer of the diol consists of the materials mentioned, i.e. of polybutadiene, polyesters, polycarbonates and polyethers having a repeat unit having at least 4 carbon atoms.

The hydrophobic diol P2 is preferably an aliphatic or cycloaliphatic diol free of aromatic constituents.

Preferably, the hydrophobic diol P2 is selected from the group consisting of polytetramethylene oxide diol, polycarbonate diol and polyester diol.

A particularly suitable polyester diol is a condensation product of 3-methylpentane-1,5-diol and adipic acid or sebacic acid. Polyester diols of this kind are available, for example, under the Kuraray P2010 trade name from Kuraray.

A particularly suitable aliphatic polycarbonate diol is based on 3-methylpentane-1,5-diol and hexane-1,6-diol and is available, for example, under the Kuraray P2050 trade name from Kuraray.

A particularly suitable aliphatic polyester carbonate diol is based on hexane-1,6-diol and ε-caprolactone is available under the Desmophen® C 1200 trade name from Bayer Material Science.

The two-component polyurethane composition preferably comprises at least one diol P2 in the form of an aliphatic or cycloaliphatic diol, preferably a polytetramethylene oxide diol or a polycarbonate diol based on 3-methylpentane-1,5-diol and hexane-1,6-diol, or a polyester carbonate diol based on hexane-1,6-diol and ε-caprolactone, or a polyester diol based on 3-methylpentane-1,5-diol and adipic acid or sebacic acid.

The hydrophobic diol P2 preferably has an average molecular weight in the range from 500 to 3'000 g/mol, especially 500 to 2'000 g/mol, more preferably 750 to 1'500 g/mol, most preferably 750 to 1'000 g/mol.

If a hydrophobic diol P2 and no compound P3 is present in the two-component polyurethane composition, the composition preferably contains a total of at least 3% by weight, especially 3% to 25% by weight, more preferably 5% to 15% by weight, of hydrophobic diol P2.

The hydrophobic diol P2 may be present as a constituent of the first component or as a constituent of the second component. If it is present as a constituent of the second component, its OH groups react with isocyanate groups present to form a prepolymer having isocyanate groups.

It is also possible to react the hydrophobic diol P2 with a diisocyanate beforehand to give a prepolymer having isocyanate groups and then to mix this prepolymer with the polyisocyanate from the second component, where the diisocyanate used for preparation of the prepolymer and the polyisocyanate present in the second component may be of the same type or different.

The hydrophobic compound P3 terminated by amino groups is suitably a constituent of the first component. In addition, it is preferable when the hydrophobic compound P3 terminated by amino groups is based on a polymer selected from polyesters, polycarbonates, and polyethers having a repeat unit having at least 4 carbon atoms. Among these, preference is given to polyethers having a repeat unit having at least 4 carbon atoms, especially in the form of polytetramethylene oxide.

The compound P3 is preferably a compound having two amino groups which are primary or secondary amino groups.

They are preferably primary aromatic amino groups optionally having steric hindrance or additional electronic hindrance.

Preferably, the compound P3 is a p-aminobenzoic diester of a hydrophobic diol.

More preferably, the compound P3 is are a p-aminobenzoic diester of a polytetramethylene oxide diol.

More preferably, the compound P3 is a p-aminobenzoic diester of a polytetramethylene oxide diol having an average molecular weight in the range from 500 to 2'000 g/mol, preferably 600 g to 1'500 g/mol, especially 600 g/mol to 1'200 g/mol.

Particularly suitable products are Versalink® P-650 and Versalink® P-1000 (both from Air Products).

The preferred compounds P3 enable compositions having a particularly high modulus of elasticity.

If a compound P3 and no hydrophobic diol P2 is present in the two-component polyurethane composition, the composition preferably contains a total of at least 3% by weight, especially 3% to 25% by weight, more preferably 5% to 15% by weight, of the compound P3.

If both a hydrophobic diol P2 and a compound P3 are present in the two-component polyurethane composition, the composition preferably contains a total of at least 3% by weight, especially 3% to 25% by weight, more preferably 5% to 15% by weight, of the sum total of hydrophobic diol P2 and compound P3.

The polybutadiene polyol P1 and the hydrophobic diol P2 and/or the compound P3 are present in the two-component polyurethane composition in such an amount that the ratio V1 of the number of hydroxyl groups from the polybutadiene polyol P1 to the number of hydroxyl groups and primary and secondary amino groups from diol P2 and the compound P3 is in the range from 2:1 to 16:1.

If both a diol P2 and a compound P3 are present in the composition, the NCO-reactive groups thereof are counted together.

NCO-reactive groups are hydroxyl groups and primary or secondary amino groups.

If the diol P2 is present in the form of a prepolymer as a constituent of the second component, the hydroxyl groups thereof are included as NCO-reactive groups in the molar ratio V1, even though they have already reacted with isocyanate groups to give urethane groups.

The molar ratio V1 is preferably in the range from 3:1 to 10:1, especially in the range from 4.5:1 to 8:1.

A higher content of polybutadiene polyol P1 enables polyurethane compositions having a somewhat lower modulus of elasticity and comparatively flexible properties.

The second component of the polyurethane composition comprises at least one polyisocyanate and optionally at least one isocyanate-terminated polyurethane prepolymer.

The polyisocyanate is especially a monomeric diisocyanate, or an oligomer or a polymer or a derivative of a monomeric diisocyanate, or any desired mixture thereof.

Oligomers and polymers are understood here to mean homopolymers and -oligomers consisting exclusively of di- or triisocyanate constituents.

Suitable aromatic monomeric diisocyanates are especially tolylene 2,4- or 2,6-diisocyanate or any desired mixtures of these isomers (TDI), diphenylmethane 4,4'-, 2,4'- or 2,2'-diisocyanate or any desired mixtures of these isomers (MDI), mixtures of MDI and MDI homologs (polymeric MDI or PMDI), phenylene 1,3- or 1,4-diisocyanate, 2,3,5, 6-tetramethyl-1,4-diisocyanatobenzene, naphthalene 1,5-diisocyanate (NDI), 3,3'-dimethyl-4,4'-diisocyanatodiphenyl (TODI) or dianisidine diisocyanate (DADI).

Among these, preference is given to MDI and TDI, especially MDI.

Suitable aliphatic monomeric diisocyanates are especially tetramethylene 1,4-diisocyanate, 2-methylpentamethylene 1,5-diisocyanate, hexamethylene 1,6-diisocyanate (HDI), 2,2(4),4-trimethylhexamethylene 1,6-diisocyanate (TMDI), decamethylene 1,10-diisocyanate, dodecamethylene 1,12-diisocyanate, lysine or lysine ester diisocyanate, cyclohexane 1,3- or 1,4-diisocyanate, 1-methyl-2,4- or -2,6-diisocyanatocyclohexane or any desired mixtures of these isomers (HTDI or $H_6$TDI), 1-isocyanato-3,3,5-trimethyl-5-isocyanatomethylcyclohexane (isophorone diisocyanate or IPDI), perhydro(diphenylmethane 2,4'- or 4,4'-diisocyanate) (HMDI or $H_{12}$MDI), 1,4-diisocyanato-2,2,6-trimethylcyclohexane (TMCDI), 1,3- or 1,4-bis(isocyanatomethyl)cyclohexane, m- or p-xylylene diisocyanate (m- or p-XDI), m- or p-tetramethylxylylene 1,3- or 1,4-diisocyanate (m- or p-TMXDI) or bis(1-isocyanato-1-methylethyl)naphthalene.

Among these, preference is given to IPDI or HDI.

Suitable oligomers, polymers or derivatives of monomeric diisocyanates are especially derived from MDI, TDI, HDI or IPDI.

Preferably, the polyisocyanate is diphenylmethane 4,4'- or 2,4'- or 2,2'-diisocyanate or any mixture of these isomers (MDI), or a mixture of MDI and MDI homologs (polymeric MDI or PMDI), or a mixture of MDI and oligomers, polymers or derivatives derived therefrom.

More preferably, the polyisocyanate is a form of MDI which is liquid at room temperature, especially having a high content of diphenylmethane 4,4'-diisocyanate. What is called "liquid MDI" is either diphenylmethane 4,4'-diisocyanate liquefied by partial chemical modification—especially carbodiimidization or uretonimine formation—or it is a mixture of diphenylmethane 4,4'-diisocyanate with other MDI isomers (2,4'-diphenylmethane diisocyanate and/or 2,2'-diphenylmethane diisocyanate), or with MDI oligomers or MDI homologs, that has been brought about selectively by blending or results from the production process.

More particularly, the polyisocyanate is a monomeric MDI type having an elevated proportion of 2,4'-MDI, for example the commercially available products Desmodur® 2424 (from Bayer MaterialScience) or Lupranat® MI (from BASF), or a mixture of monomeric MDI and MDI homologs having a low proportion of homologs, for example the commercially available products Desmodur® VL50 (from Bayer MaterialScience) or Voranate® M 2940 (from Dow), or a partially carbodiimidized diphenylmethane 4,4'-diisocyanate, for example the commercially available products Desmodur® CD (from Bayer Material Science), Lupranat® MM 103 (from BASF), Isonate® M 143 or Isonate® M 309 (both from Dow), Suprasec® 2020 or Suprasec® 2388 (both from Huntsman).

With these polyisocyanates, particularly good processing properties and particularly high strengths are obtained.

Any isocyanate-terminated polyurethane prepolymer present is preferably based on a monomeric diisocyanate selected from the group consisting of MDI, TDI, IPDI and HDI. Among these, preference is given to MDI or TDI.

Any isocyanate-terminated polyurethane prepolymer present, in a preferred embodiment, is based on the same monomeric diisocyanate as the polyisocyanate present.

In a further preferred embodiment, the monomeric diisocyanate used for preparation of the isocyanate-terminated polyurethane polymer is different than the polyisocyanate present in the second component.

Any isocyanate-terminated polyurethane prepolymer present, in a preferred embodiment, has been prepared from at least one hydrophobic diol P2, as described above, and at least one monomeric diisocyanate. This reaction can be effected separately from the polyisocyanate of the second component, and it is possible to use a diisocyanate other than this polyisocyanate. Alternatively, the reaction can be effected in such a way that the hydrophobic diol P2 is mixed with the polyisocyanate of the second component, forming an isocyanate-terminated polyurethane prepolymer in situ.

Any isocyanate-terminated polyurethane prepolymer present, in a further preferred embodiment, has been prepared from at least one di- or polyol other than the hydrophobic diol P2, in which case the prepolymer content in the composition is relatively low, and so the hydrophobicity of the overall composition is largely conserved. Preferably, the proportion of such a prepolymer not based on a hydrophobic diol P2 in the overall composition is not more than 5% by weight, especially not more than 2% by weight.

A particularly preferred isocyanate-terminated polyurethane prepolymer is based on a diol P2 which is a polybutadienediol, preference being given especially to Krasol® LBH P-2000 or Krasol® LBH P-3000 (from Cray Valley). This especially enables good processibility.

A further particularly preferred isocyanate-terminated polyurethane prepolymer is based on a diol P2 which is a polycarbonate diol, preference being given especially to Desmophen® C 1200 (from Bayer Material Science). This especially enables a particularly low dependence of the modulus of elasticity E* on temperature.

In the overall polyurethane composition, the molar ratio of the isocyanate groups present to the NCO-reactive groups present is in the range from 1.5:1 to 1:1, especially 1.25:1 to 1:1, more preferably 1.15:1 to 1:1.

The polyurethane composition may additionally comprise further substances reactive with isocyanate groups, especially what are called chain extenders, which are typically diols having a molecular weight of less than 200 g/mol. Preferably, the first component of the composition, however, contains only small proportions of chain extenders, preferably not more than 5% by weight, more preferably not more than 2% by weight, especially not more than 0.5% by weight. A high content of chain extenders reduces the elasticity of the composition to an excessive degree.

The polyurethane composition may further comprise catalysts which accelerate the reaction of hydroxyl groups with isocyanate groups.

Preferably, there is at least one catalyst present, especially selected from the group consisting of bismuth(III) compounds, zinc(II) compounds and zirconium(IV) compounds.

More preferably, the catalyst is a bismuth(III) carboxylate, a Zn(II) carboxylate, a bismuth(III) 1,3-ketoacetate, a zirconium(IV) 1,3-ketoacetate, a bismuth(III) oxinate, a bismuth(III) 1,3-ketoamidate, a zirconium(IV) 1,3-ketoamidate, a zirconium(IV) diketonate, or a mixture thereof.

It is also possible to add non-metal-based catalysts, such as, more particularly, tertiary amines, amidines or guanidines.

In the context of the present invention, it is not a matter of major significance whether the catalyst is formulated as a constituent of the first or second component, or whether both components contain a proportion of catalyst. However, it is preferable when the catalyst is formulated as a constituent of the first component. If the second component is formulated with in situ formation of an isocyanate-terminated polyurethane prepolymer, it is appropriate when at least a portion of the total amount of catalyst is added to the second component. Even when an isocyanate-terminated polyurethane prepolymer which has been prepared separately from the polyisocyanate of the second component is used, it may be preferable that a catalyst which is ultimately present in the second component has been used for preparation thereof.

The polyurethane composition may, as well as the constituents already mentioned, comprise further constituents as known to the person skilled in the art from two-component polyurethane chemistry. These may be present in just one component or in both.

Suitable further constituents are fillers, solvents, plasticizers, adhesion promoters, stabilizers, rheology aids, desiccants such as zeolites in particular, stabilizers against oxidation, heat, light or UV radiation, flame-retardant substances, or surface-active substances such as wetting agents or defoamers in particular.

The composition preferably comprises at least one filler.

Particular preference is given to inorganic or organic fillers, especially natural, ground or precipitated calcium carbonates, optionally coated with fatty acids, especially stearic acid, baryte (heavy spar), talcs, quartz flours, quartz sand, dolomites, wollastonites, kaolins, calcined kaolins, mica (potassium aluminum silicate), molecular sieves, aluminum oxides, aluminum hydroxides, magnesium hydroxide, silicas including finely divided silicas from pyrolysis processes, graphite, carbon black, metal powders such as aluminum, copper, iron, silver or steel, PVC powder and/or hollow spheres.

The addition of fillers is advantageous in that it affects the rheological properties and it is possible to increase the strength of the cured polyurethane composition. Preferably, the polyurethane composition comprises at least one filler selected from the group consisting of calcium carbonate, especially in ground form, kaolin, baryte, talc, quartz flour, dolomite, wollastonite, kaolin, calcined kaolin, mica and carbon black.

The use of carbon black especially also increases the thixotropy or creep resistance of the composition, which is preferable. A particularly suitable thixotropic agent is industrially produced carbon black.

The proportion of the fillers in the polyurethane composition is preferably in the range from 5% to 60% by weight, more preferably in the range from 5% to 50% by weight and especially in the range from 10% to 40% by weight.

The proportion of carbon black is preferably in the range from 1% to 15% by weight, especially in the range from 5% to 15% by weight.

Preferably, the composition comprises at least one adhesion promoter, especially at least one organoalkoxy silane such as, more particularly, an aminosilane, mercaptosilane, epoxysilane, vinylsilane, (meth)acryloylsilane, isocyanatosilane, carbamatosilane, alkylsilane or S-(alkylcarbonyl) mercaptosilane or an oligomeric form of these silanes.

A particularly suitable adhesion promoter is 3-glycidoxypropyltrimethoxysilane, 3-aminopropyltrimethoxysilane, N-(2-aminoethyl)-3-aminopropyltrimethoxysilane, N-(2-aminoethyl)-N'-[3-(trimethoxysilyl)propyl]ethylenediamine, 3-mercaptopropyltrimethoxysilane, 3-isocyanatopropyltrimethoxysilane, 3-ureidopropyltrimethoxysilane or vinyltrimethoxysilane, or the corresponding silanes having ethoxy groups rather than the methoxy groups on the silicon.

The polyurethane composition may further comprise plasticizers. The polyurethane composition preferably comprises less than 5% by weight, more preferably less than 1% by weight, especially less than 0.1% by weight, of plasticizers.

This is advantageous in that there can be no occurrence of weakening of adhesive bonds or seals triggered by plasticizers migrating out of the cured composition.

A preferred polyurethane composition comprises a first component comprising a content of polyols and polyamines in the range from 30% to 90% by weight, preferably 40% to 80% by weight, especially 50% to 60% by weight, and a content of fillers of 10% to 70% by weight, preferably 20% to 60% by weight, especially 20% to 40% by weight, and optionally further constituents.

A preferred polyurethane composition comprises a second component comprising 50% to 100% by weight, especially 90% to 100% by weight, of a form of MDI which is liquid at room temperature.

A further preferred polyurethane composition comprises a second component comprising a content of isocyanate-terminated polyurethane prepolymer in the range from 10% to 80% by weight, preferably 25% to 70% by weight, the prepolymer being based on a hydrophobic diol P2.

In the context of the present invention, it has been found that, surprisingly, improved elongation at break and tensile stress values are obtained with compositions in which the second component comprises an isocyanate-terminated polyurethane prepolymer obtainable by reaction of a hydrophobic diol P2 and a polyisocyanate, compared to an analogous composition in which the same diol P2 is present in the first component, while the modulus of elasticity is somewhat lower. Depending on the desired application properties, it may be preferable here that the second component either consists essentially entirely of a polyisocyanate that has not been converted to a polyurethane prepolymer or contains an isocyanate-terminated polyurethane prepolymer which has been formed by combination of a polyisocyanate with the hydrophobic diol P2.

It is further preferable in the context of the present invention when the composition of the invention, after curing, has an elongation at break in the range from 200% to 500%, preferably in the range from 250% to 400%.

It is further preferable when the modulus of elasticity (determined in the range from 0.5% to 5% elongation) is in the range from 3 to 5 MPa, especially in the range from 3 to 4 MPa.

It is further preferable when the tensile strength at 23° C. is in the range from 2.5 to 5 MPa, especially in the range from 3 to 4.5 MPa.

It is especially preferable when the composition after curing fulfills all the specifications above in relation to elongation at break, modulus of elasticity and tensile strength.

The two components are produced separately from one another and, at least for the second component, preferably with exclusion of moisture. The two components are typically each stored in a separate container.

The further constituents of the polyurethane composition of the invention may be present as a constituent of the first or second component, and further constituents that are reactive toward isocyanate groups are preferably part of the first component.

The two components are stored separately from one another prior to the mixing of the composition and are only mixed with one another on or immediately prior to use.

A suitable container for storage of the respective component is especially a vat, a hobbock, a bag, a bucket, a can, a cartridge or a tube. The components are both storage-stable, meaning that they can be stored prior to use for several months up to one year or longer, without any change in their respective properties to a degree of relevance to their use.

For the use of the composition, the first and second components are mixed with one another. The mixing is typically effected via static mixers or with the aid of dynamic mixers. In the mixing, it should preferably be ensured that the two components are mixed with maximum homogeneity. If the components are mixed incompletely, local deviations from the advantageous mixing ratio will occur, which can result in a deterioration in the mechanical properties.

On contact of the first component with isocyanate groups of the second component, curing commences by chemical reaction. This involves reaction of hydroxyl groups and primary and secondary amino groups and any further substances reactive toward isocyanate groups that are present with isocyanate groups that are present. Excess isocyanate groups react with moisture present. As a result of these reactions, the composition cures to give a solid material. This operation is also referred to as crosslinking. This gives rise to a cured polyurethane composition.

The two-component polyurethane composition of the invention is advantageously usable as structural adhesive or as sealing compound.

The invention thus also relates to a method of bonding a first substrate to a second substrate, comprising the steps of:
  mixing the first and second components described above,
  applying the mixed polyurethane composition to at least one of the substrate surfaces to be bonded, and
  joining the two substrates within the open time of the mixed polyurethane composition.

These two substrates may consist of the same material or different materials.

Suitable substrates are especially
  glass, glass ceramic, glass mineral fiber mats;
  metals or alloys, such as aluminum, iron, steel and non-ferrous metals, or surface-finished metals or alloys such as galvanized or chromed metals;
  coated or painted substrates, such as powder-coated metals or alloys or painted sheet metal;
  plastics, such as polyvinyl chloride (rigid and flexible PVC), acrylonitrile-butadiene-styrene copolymers (ABS), polycarbonate (PC), polyamide (PA), poly(methyl methacrylate) (PMMA), polyester, epoxy resins, especially epoxy-based thermosets, polyurethanes (PUR), polyoxymethylene (POM), polyolefins (PO), polyethylene (PE) or polypropylene (PP), polystyrene (PS), ethylene/propylene copolymers (EPM) or ethylene/propylene/diene terpolymers (EPDM), where the plastics may preferably have been surface-treated by means of plasma, corona or flames;
  fiber-reinforced plastics, such as carbon fiber-reinforced plastics (CFP), glass fiber-reinforced plastics (GFP) or sheet molding compounds (SMC);

wood, woodbase materials bonded with resins, for example phenolic, melamine or epoxy resins, resin-textile composites or further polymer composites; or concrete, mortar, brick, gypsum or natural stone such as granite, limestone, sandstone or marble.

In said method, one or both of the substrates is preferably a metal, a glass ceramic or a glass, a glass fiber-reinforced plastic or a carbon fiber-reinforced plastic, an epoxy-based thermoset or a polymer substrate having low surface energy, such as a polyolefin, polymethylmethacrylate or polycarbonate substrate.

More particularly, one or both of the substrates is a metal, a ceramic, a glass fiber-reinforced plastic, a carbon fiber-reinforced plastic or a polymer substrate having low surface energy, such as a polyolefin, polymethylmethacrylate or polycarbonate substrate.

Especially preferably, one or both of the substrates is a metal, especially steel, or a polymer substrate having low surface energy, such as a polyolefin, polymethylmethacrylate or polycarbonate substrate.

The substrates can be pretreated if required prior to the application of the composition. Pretreatments of this kind especially include physical and/or chemical cleaning methods, and the application of an adhesion promoter, an adhesion promoter solution or a primer.

The invention further relates to a method of sealing, especially of joins and gaps between two substrates, comprising the steps of:

mixing the first and second components described above,
applying the mixed polyurethane composition to a substrate or between two substrates within the open time.

In these methods of sealing, the substrates mentioned above for the method of adhesive bonding are particularly suitable.

The two-component polyurethane composition described is likewise advantageously usable as a potting compound.

A further aspect of the present invention relates to the use of the two-component polyurethane composition described as an adhesive or sealant, especially for plastic, composite material or metal substrates in the building and manufacturing industry, or in motor vehicle construction, more preferably for the adhesive bonding of installable components, assembly, bodywork bonding, module bonding, window glass bonding, headlamp bonding, seam sealing or cavity sealing, wherein the two components are mixed and the mixed composition is applied to at least one substrate and then cured, optionally after contacting with a further substrate within the open time.

The polyurethane composition of the invention features high strength and elasticity, which is relatively constant over a broad temperature range from about −45° C. to 150° C., and has good, largely temperature-independent bonding properties to metallic and nonmetallic substrates. Owing to these properties, the polyurethane composition of the invention is particularly suitable as a structural adhesive for bonds that are subjected to stress outdoors at ambient temperatures.

By virtue of the proportion of polybutadiene polyol P1, the cured composition is very hydrophobic and water-repellent. This can promote high water vapor diffusion resistance of the material. As a result, the composition is also especially suitable for bonds where water vapor-sensitive components, for example electronic components or headlamps, are to be sealed with adhesive bonding.

The polyurethane composition of the invention is likewise advantageously usable as a potting compound, especially as a potting paste for the filling of gaps or joins, for repair purposes as a stress compensation compound or for protection of electronic components.

EXAMPLES

Substances Used:

| | |
|---|---|
| Poly bd R45 | Polybutadiene polyol, OH functionality about 2.5, average molecular weight about 2800 g/mol, OH number 47.1 mg KOH/g (Poly bd ® R-45HTLO from Cray Valley) |
| PolyTHF 2000 | Polytetramethylene oxide diol, average molecular weight about 2000 g/mol, OH number 56 mg KOH/g (PolyTHF ® 2000 from BASF) |
| Kuraray P2010 | Polyester diol, average molecular weight about 2000 g/mol, OH number 56 mg KOH/g (Kuraray P-2010 from Kuraray) |
| Krasol 2000 | Polybutadienediol, OH functionality about 1.9, average molecular weight about 2000 g/mol, OH number 50 mg KOH/g, (Krasol ® LBH P-2000 from Cray Valley) |
| Caradol | Polypropylene oxide diol, average molecular weight about 2000 g/mol, OH number 56 mg KOH/g (Caradol ® ED 56 from Shell) |
| Desmophen C1200 | Polyester carbonate diol, average molecular weight about 2000 g/mol, OH number 56 mg KOH/g (Desmophen ® C 1200 from Bayer Material Science) |
| Versalink P-1000 | p-Aminobenzoic diester of polytetramethylene oxide diol, average molecular weight about 1200 g/mol, amine number 95 mg KOH/g (Versalink ® P-1000 from Air Products) |
| Versalink P-650 | p-Aminobenzoic diester of polytetramethylene oxide diol, average molecular weight about 850 g/mol, amine number 120 mg KOH/g (Versalink P-650 from Air Products) |
| Catalyst | Bismuth(III) carboxylate (K-Kat ® XC-C227 from King Industries) |
| Filler | Mineral filler based on calcium carbonate (Winnofil ® SPT from Solvay) |
| Carbon black | Monarch ® 120 from Cabot |
| Polyisocyanate | Modified diphenylmethane diisocyanate containing MDI-carbodiimide adducts, liquid at room temperature, NCO content 29.4% by weight (Isonate ® M 143 from Dow) |
| Krasol-MDI prep. | Prepolymer of 82% by weight of Krasol ® LBH P 2000 (see above) and 18% by weight of MDI (Lupranat ® MI from BASF with 2,4'- and 4,4'-MDI in a weight ratio of 1:1) |
| Krasol-TDI prep. | Prepolymer of 87% by weight of Krasol ® LBH P 2000 (see above) and 13% by weight of TDI (Desmodur ® T-80 from Bayer) |
| C1200-TDI prep. | Prepolymer of 85% by weight of Desmophen ® C1200 (see above) and 15% by weight of TDI (Desmodur ® T-80 from Bayer) |
| Desmophen-MDI prep. | Prepolymer of 80% by weight of Desmophen ® C1200 (see above) and 20% by weight of MDI (Lupranat ® MI from BASF with 2,4'- and 4,4'-MDI in a weight ratio of 1:1) |

Preparation of Polyurethane Compositions of the Invention

For each composition, the ingredients specified in tables 1, 3 and 5 were processed in the amounts specified (in parts by weight) of the first component, component-1, by means of a vacuum dissolver with exclusion of moisture to give a homogeneous paste, and stored. The ingredients of the second component, component-2, specified in tables 1, 3 and 5 were likewise processed and stored. Subsequently, the two components were processed by means of a SpeedMixer® (DAC 150 FV, Hauschild) for 30 seconds to give a homogeneous paste and immediately tested as follows:

For determination of the mechanical properties, the adhesive was converted to dumbbell form according to ISO 527, Part 2, 1B, and stored/cured at 23° C. for 24 h and then at 80° C. for 3 h. After a conditioning period of 24 h, the modulus of elasticity, the tensile strength and the elongation at break of the specimens thus produced were measured according to ISO 527 on a Zwick Z020 tensile tester at the respective temperature specified in the tables and a testing speed of 200 mm/min.

For measurement of the tensile shear strength, various test specimens were produced, by applying the adhesive 1 minute after conclusion of the mixing time in each case between two heptane-degreased cathodically electrocoated (e-coated) steel sheets or isopropanol-degreased polycarbonate sheets (uncoated Makrolon®) in a layer thickness of 1.6 mm and over an overlapping bonding area of 15×45 mm. The test specimens were stored/cured at 23° C. for 24 h and then at 80° C. for 3 h. After a conditioning period of 24 h at 23° C., the tensile shear strength was determined according to DIN EN 1465 at a pulling speed of 10 mm/min, unless stated otherwise.

The Tg (glass transition temperature) was determined from DMTA measurements on strip samples (height 2-3 mm, width 2-3 mm, length 8.5 mm) which were stored/cured at 23° C. for 24 h and then at 80° C. for 3 h, with a Mettler DMA/SDTA 861e instrument. The measurement conditions were: measurement in tensile mode, excitation frequency 10 Hz and heating rate 5 K/min. The samples were cooled down to −70° C. and heated to 200° C. with determination of the complex modulus of elasticity E* [MPa], and a maximum in the curve for the loss angle "tan δ" was read off as Tg.

Z-1 to Z-15 are inventive examples. Rf.1 to Rf.8 are comparative examples. The values stated in table 1, 3 and 5 each denote parts by weight in the overall composition.

TABLE 1

| Examples | Z-1 | Z-2 | Z-3 | Z-4 | Rf.1 | Z-5 |
|---|---|---|---|---|---|---|
| Component-1: | | | | | | |
| Poly bd R45 | 60 | 60 | 60 | 60 | 70 | 60 |
| PolyTHF 2000 | 10 | — | — | — | — | — |
| Desmophen C1200 | — | 10 | — | — | — | — |
| Kuraray P2010 | — | — | 10 | — | — | — |
| Versalink P-650 | — | — | — | — | — | 10 |
| Versalink P-1000 | — | — | — | 10 | — | — |
| Filler | 20 | 20 | 20 | 20 | 20 | 20 |
| Carbon black | 10 | 10 | 10 | 10 | 10 | 10 |
| Catalyst | 0.04 | 0.04 | 0.04 | 0.04 | 0.04 | 0.04 |
| Component-2: | | | | | | |
| Polyisocyanate | 9.0 | 9.0 | 9.0 | 10.1 | 9.2 | 11.2 |
| Molar ratio V1[1] | 5.0 | 5.0 | 5.0 | 3.0 | — | 2.4 |

[1]Ratio of the number of OH groups of Poly bd R45 to the sum total of the number of OH and NH$_2$ groups from Poly THF 2000, Kuraray P2010, Desmophen C1200, Versalink P-650 and Versalink P-1000

TABLE 2

| Examples | Z-1 | Z-2 | Z-3 | Z-4 | Rf.1 | Z-5 |
|---|---|---|---|---|---|---|
| Tensile shear strength [MPa] | 2.8[1] | 2.5[1] | 2.9[1] | 3.3[1] | 2.5[1] | 2.6[1] |
| 1.6 mm onto e-coat/e-coat | 100CF | 100CF | 80CF/ 20SCF | 100CF | 100CF | 95CF/ 5SCF |
| 1.6 mm onto PC/PC[2] | n.d. | 2.7[1] 90CF/ 10SCF | 2.3[1] 70CF/ 30SCF | n.d. | 1.4[1] 90AF/ 10CF | 2.0[1] 100 SCF |
| Tensile strength [MPa] 23° C. | 3.1 | 3.8 | 3.0 | 3.0 | 2.6 | 2.5 |
| Elongation at break [%] 23° C. | 394 | 383 | 299 | 231 | 182 | 169 |
| Modulus of elasticity 0.5 to 5% [MPa] 23° C. | 3.8 | 3.2 | 3.6 | 5.0 | 4.9 | 5.8 |
| Shore A | 58 | 54 | 57 | 65 | 66 | 61 |
| 1st Tg (° C.) | −47 | −56 | −56 | −60 | −58 | −54 |
| 2nd Tg (° C.) | — | −10 | −17 | — | — | 70 |
| 3rd Tg (° C.) | 168 | 160 | 160 | 155 | 158 | — |

[1]determined at 20 mm/min;
[2]PC stands for polycarbonate (Makrolon); "n.d." stands for "not determined"; CF stands for cohesive failure; SCF stands for substrate/cohesive failure; AF stands for adhesive failure.

TABLE 3

| Examples | Z-3 | Z-6 | Z-7 | Z-8 | Rf.2 | Rf.3 | Rf.4 | Rf.5 | Rf.6 | Rf.7 | Rf.8 |
|---|---|---|---|---|---|---|---|---|---|---|---|
| Component-1: | | | | | | | | | | | |
| Poly bd R45 | 60 | 60 | 63 | 66.5 | 45 | 25 | 21 | — | 60 | — | 45 |
| Krasol 2000 | — | — | — | — | — | — | — | 60 | — | 45 | — |
| Kuraray P2010 | 10 | — | 7 | 3.5 | 25 | 45 | 49 | 10 | — | 25 | — |
| Caradol | — | — | — | — | — | — | — | — | 10 | — | 25 |
| Filler | 20 | 20 | 20 | 20 | 20 | 20 | 20 | 20 | 20 | 20 | 20 |
| Carbon black | 10 | 10 | 10 | 10 | 10 | 10 | 10 | 10 | 10 | 10 | 10 |
| Catalyst | 0.04 | 0.04 | 0.04 | 0.04 | 0.04 | 0.04 | 0.04 | 0.04 | 0.04 | 0.04 | 0.04 |
| Component-2: | | | | | | | | | | | |
| Polyisocyanate | 9.0 | 9.0 | 9.0 | 8.9 | 9.4 | 9.9 | 10 | 10.2 | 8.9 | 10.2 | 9.8 |
| Kuraray P2010 | — | 10 | — | — | — | — | — | — | — | — | — |
| Molar ratio V1[1] | 5.0 | 5.0 | 7.6 | 16.0 | 1.5 | 0.4 | 0.3 | (5.4) | (5.0) | 1.6 | 1.5 |

[1]Ratio of the number of OH groups of Poly bd R45 (or Krasol 2000) to the sum total of the number of OH and NH$_2$ groups from Poly THF 2000 (or Caradol), Kuraray P2010 and Desmophen C1200

TABLE 4

| Examples | Z-3 | Z-6 | Z-7 | Z-8 | Rf.2 | Rf.3 | Rf.4 | Rf.5 | Rf.6 | Rf.7 | Rf.8 |
|---|---|---|---|---|---|---|---|---|---|---|---|
| Tensile shear strength [MPa] 1.6 mm onto e-coat/e-coat[1] | 2.9[1] 80CF/ 20SCF | 2.6 90CF/ 10SCF | 2.2 80CF/ 20SCF | 2.5 80CF/ 20SCF | 1.8 60CF/ 40AF | 0.7 100SCF | 0.5 100SCF | 0.08 | 2.1 CF95 SCF5 | 0.04 — | 1.05 100SCF |
| 1.6 mm onto PC/PC[2] | 2.3[1] 70CF/ 30SCF | 2.8 80CF/ 20SCF | 2.4 70CF/ 30SCF | 2.5 50CF/ 50SCF | 2.1 90CF/ 10AF | 0.4 100AF | 0.3 90AF/ 10SCF | 0.06 | 2.4 50CF/ 50SCF | 0.03 — | 0.9 95SCF/ 5AF |
| Tensile strength [MPa] 23° C. | 3.0 | 3.8 | 3.1 | 2.6 | 4.0 | 4.9 | 4.0 | 0.3 | 2.5 | 0.4 | 2.3 |
| Elongation at break [%] | 299 | 378 | 358 | 288 | 527 | 726 | 736 | 153 | 351 | 238 | 473 |
| Modulus of elasticity 0.5 to 5% [MPa] 23° C. | 3.6 | 3.1 | 3.1 | 3.3 | 2.7 | 2.7 | 2.5 | 1.5 | 2.3 | 0.8 | 1.6 |
| Shore A | 57 | 53 | 54 | 47 | 52 | 50 | 52 | 28 | 46 | 31 | 39 |
| 1st Tg (° C.) | −56 | −52 | −55 | −52 | −54 | −26 | −28 | −12 | −45 | −12 | −28 |
| 2nd Tg (° C.) | −17 | −17 | −17 | −14 | −22 | — | — | — | — | — | 80 |
| 3rd Tg (° C.) | 160 | 160 | 160 | 160 | 160 | 145 | 140 | 140 | 160 | 140 | 158 |

[1] determined at 20 mm/min;
[2] PC stands for polycarbonate (Makrolon); CF stands for cohesive failure; SCF stands for substrate/cohesive failure; AF stands for adhesive failure.

TABLE 5

| Examples | Z-3 | Z-9 | Z-10 | Z-11 | Z-12 | Z-13 | Z-14 | Z-15 |
|---|---|---|---|---|---|---|---|---|
| Component-1: | | | | | | | | |
| Poly bd R45 | 60 | 60 | 60 | 60 | 60 | 60 | 60 | 60 |
| Kuraray P2010 | 10 | 10 | 10 | 10 | 10 | — | — | — |
| Filler | 20 | 20 | 20 | 20 | 20 | 20 | 20 | 20 |
| Carbon black | 10 | 10 | 10 | 10 | 10 | 10 | 10 | 10 |
| Catalyst | 0.04 | 0.04 | 0.04 | 0.04 | 0.04 | 0.04 | 0.04 | 0.04 |
| Component-2: | | | | | | | | |
| Polyisocyanate | 9.0 | 8.2 | 6.4 | 8.2 | 6.5 | 7.5 | 7.6 | 5.9 |
| Krasol-MDI prep. | — | 8.2 | 25.6 | — | — | — | — | — |
| Krasol-TDI prep. | — | — | — | 8.3 | 26 | — | — | — |
| C1200-TDI prep. | — | — | — | — | — | 7.5 | — | — |
| C1200-MDI prep. | — | — | — | — | — | — | 7.6 | 23.6 |
| Molar ratio V1[1] | 5.0 | 5.6 | 6.9 | 5.7 | 7.1 | 7.8 | 8.3 | 2.7 |

[1] Ratio of the number of OH groups of Poly bd R45 to the sum total of the number of OH and NH$_2$ groups from Poly THF 2000, Kuraray P2010, Desmophen C1200 and Versalink P-650 and Versalink P-1000

TABLE 6

| Examples | Z-3 | Z-9 | Z-10 | Z-11 | Z-12 | Z-13 | Z-14 | Z-15 |
|---|---|---|---|---|---|---|---|---|
| Tensile shear strength [MPa] 1.6 mm onto e-coat/e-coat | 2.9[1] 80CF/ 20SCF | 2.7 100CF | 3.3 10CF/ 90SCF | 2.9 10CF/ 90SCF | 3.1 10CF/ 90SCF | 2.9 90CF/ 10SCF | 2.7 100CF | 3.3 90CF/ 10SCF |
| 1.6 mm onto PC/PC[2] | 2.3[1] 70CF/ 30SCF | 3.4 100CF | 3.4 10CF/ 90SCF | 2.9 30CF/ 70SCF | 3.2 80CF/ 20SCF | 3.1 100CF | 3.4 100CF | 3.4 90CF/ 10SCF |
| Tensile strength [MPa] 23° C. | 3.0 | 2.9 | 3.2 | 3.0 | 2.1 | 3.4 | 4.0 | 3.4 |
| Elongation at break [%] 23° C. | 299 | 292 | 327 | 415 | 524 | 295 | 282 | 390 |
| Modulus of elasticity 0.5 to 5% [MPa] 23° C. | 3.6 | 3.4 | 3.1 | 2.4 | 3.6 | 4.1 | 4.2 | 2.9 |
| Shore A | 57 | 55 | 58 | 51 | 48 | 61 | 59 | 53 |
| 1st Tg (° C.) | −56 | −47 | −47 | −40 | −38 | −53 | −52 | −53 |
| 2nd Tg (° C.) | −17 | −17 | −17 | — | — | −15 | −12 | −14 |
| 3rd Tg (° C.) | 160 | 162 | 162 | 158 | 158 | 160 | 160 | 160 |

[1] determined at 20 mm/min;
[2] PC stands for polycarbonate (Makrolon); CF stands for cohesive failure; SCF stands for substrate/cohesive failure The plot of the modulus of elasticity (complex modulus of elasticity E* [MPa] as a function of the temperature [° C.]) for the compositions Rf.1 (♦), Rf. 3 (□), Z-3 (▲), Z-6 (○) and Z-10 (+) is shown in FIG. 1. This shows that the noninventive compositions, within the temperature range between −20° C. and 120° C., have a comparatively strong dependence of the complex modulus of elasticity E* on temperature (Rf. 3) or, like Rf.1, have a very minor dependence of the complex modulus of elasticity on temperature at these temperatures but also have only very low values for the moduli of elasticity. For the inventive compositions, by comparison, a dependence of the modulus E* on temperature comparable to Rf.1 is found, with modulus values higher by a factor of 2-3. By comparison with Rf.3, much higher values are obtained for the modulus E* at temperatures above 120° C.

Rf. 1 shows almost ideal flexible characteristics with very low dependence of the modulus of elasticity E* on temperature, but is unsuitable as an adhesive owing to inadequate bonding properties, especially to polycarbonate.

The invention claimed is:

1. A two-component polyurethane composition comprising
   a first component comprising at least one polybutadiene polyol P1 having an average molecular weight $M_n$ the range from 2'000 to 10'000 g/mol and an average OH functionality in the range from 2.1 to 4, and
   a second component comprising at least one polyisocyanate and optionally at east one isocyanate-terminated polyurethane prepolymer,
   wherein the polyurethane composition further comprises
   at least one hydrophobic diol P2 having an average molecular weight $M_n$ in the range from 500 to 5'000 g/mol selected from the group consisting of polyester diols, polycarbonate diols and polyether diols having a repeat unit having at least 4 carbon atoms,
   and optionally
   at least one hydrophobic compound P3 terminated by amino groups and having an average molecular weight $M_n$ in the range from 200 to 2'000 g/mol,
       where the molar ratio V1 of the number of hydroxyl groups from the polybutadiene polyol P1 to the number of hydroxyl and primary and secondary amino groups from diol P2 and the compound P3 is in the range from 4.5:1 to 16:1, and where the average molecular weight $M_n$ is determined by gel permeation chromatography against polystyrene as standard.

2. The two-component polyurethane composition as claimed in claim 1, wherein the polybutadiene polyol P1 has an average OH functionality in the range from 2.1 to 2.9.

3. The two-component polyurethane composition as claimed in claim 1, wherein it comprises at least one diol P2 in the form of a polytetramethylene oxide diol or a polycarbonate diol based on 3-methylpentane-1,5-diol and hexane-1,6-diol, or a polyester carbonate diol based on hexane-1,6-diol and ε-caprolactone, or a polyester diol based on 3-methylpentane-1,5-diol and adipic acid or sebacic acid.

4. The two-component polyurethane composition as claimed in claim 1, wherein the diol P2 has an average molecular weight $M_n$ in the range from 500 to 2'000 g/mol.

5. The two-component polyurethane composition as claimed in claim 1, wherein the compound P3 is present and is a p-aminobenzoic diester of a polytetramethylene oxide diol.

6. The two-component polyurethane composition as claimed in claim 1, wherein the polyisocyanate is diphenylmethane 4,4'- or 2,4'- or 2,2'-diisocyanate or any mixture of these isomers (MDI), or a mixture of MDI and MDI homologs (polymeric MDI or PMDI), or a mixture of MDI and oligomers, polymers or derivatives derived therefrom.

7. The two-component polyurethane composition as claimed in claim 1, wherein the parent monomeric diisocyanate of the isocyanate-terminated polyurethane prepolymer is selected from the group consisting of diphenylmethane 4,4'- or 2,4'- or 22'-diisocyanate or any mixture of these isomers (MDI), tolylene 2,4- or 2,6-diisocyanate or any mixtures of these isomers (TDI), 1-isocyanato-3,3,5-trimethyl-5-isocyanatomethylcyclohexane (IPDI) and hexamethylene 1,6-diisocyanate (HDI).

8. The two-component polyurethane composition as claimed in claim 1, wherein it further comprises at least one catalyst.

9. The two-component polyurethane composition as claimed in claim 8, wherein the catalyst is a bismuth(III) carboxylate, a Zn(II) carboxylate, a bismuth(III) 1,3-ketoacetate, a zirconium(IV) 1,3-ketoacetate, a bismuth(III) oxinate, a bismuth(III) 1,3-ketoamidate, a zirconium(IV) 1,3-ketoamidate, a zirconium(IV) diketonate, or a mixture thereof.

10. The two-component polyurethane composition as claimed in claim 1, wherein it further comprises at least one filler.

11. The two-component polyurethane composition as claimed in claim 1, wherein it further comprises at least one adhesion promoter.

12. The two-component polyurethane composition as claimed in claim 1, wherein it has a content of plasticizers of less than 1% by weight.

13. A method of bonding a first substrate to a second substrate, comprising the steps of:
    mixing the first and second components of the polyurethane composition as claimed in claim 1,
    applying the mixed polyurethane composition to at least one of the substrate surfaces to be bonded, and
    joining the two substrates within the open time of the mixed polyurethane composition.

14. The method as claimed in claim 13, wherein one or both of the substrates is a metal, a ceramic, a glass fiber-reinforced plastic, a carbon fiber-reinforced plastic or a polymer substrate having low surface energy, such as a polyolefin, polymethylmethacrylate or polycarbonate substrate.

15. The two-component polyurethane composition as claimed in claim 1, wherein the diol P2 is a polyester diol.

16. The two-component polyurethane composition as claimed in claim 15, wherein the polyester diol has an average molecular weight of about 2000 g/mol.

* * * * *